United States Patent
Holland et al.

(10) Patent No.: US 7,810,029 B2
(45) Date of Patent: *Oct. 5, 2010

(54) METHOD AND SYSTEM FOR IDENTIFYING RELATIONSHIPS BETWEEN TEXT DOCUMENTS AND STRUCTURED VARIABLES PERTAINING TO THE TEXT DOCUMENTS

(75) Inventors: Karen Mae Holland, Auburn, CA (US); Jeffrey Thomas Kreulen, San Jose, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 919 days.

This patent is subject to a terminal disclaimer.

(21) Appl. No.: 11/592,957

(22) Filed: Nov. 6, 2006

(65) Prior Publication Data

US 2007/0061348 A1 Mar. 15, 2007

Related U.S. Application Data

(63) Continuation of application No. 09/837,158, filed on Apr. 19, 2001, now Pat. No. 7,155,668.

(51) Int. Cl.
*G06F 17/00* (2006.01)
(52) U.S. Cl. .................................. 715/256; 707/765
(58) Field of Classification Search ................ 707/1–3, 707/5, 7, 203, 765, 802, 999.005; 715/256, 715/259; 382/306

See application file for complete search history.

(56) References Cited

U.S. PATENT DOCUMENTS

| | | | | |
|---|---|---|---|---|
| 5,122,951 | A | * | 6/1992 | Kamiya |
| 5,251,268 | A | * | 10/1993 | Colley |
| 5,371,673 | A | * | 12/1994 | Fan |
| 5,384,703 | A |   | 1/1995 | Withgott et al. |
| 5,414,797 | A | * | 5/1995 | Vassiliadis |
| 5,544,360 | A | * | 8/1996 | Lewak et al. ................... 707/1 |
| 5,659,766 | A | * | 8/1997 | Saund |
| 5,675,710 | A | * | 10/1997 | Lewis |
| 5,694,592 | A |   | 12/1997 | Driscoll |
| 5,819,258 | A | * | 10/1998 | Vaithyanathan |
| 5,857,179 | A |   | 1/1999 | Vaithyanathan et al. |
| 5,963,965 | A | * | 10/1999 | Vogel |
| 6,038,574 | A | * | 3/2000 | Pitkow |
| 6,047,277 | A | * | 4/2000 | Parry |
| 6,100,901 | A |   | 8/2000 | Mohda et al. |
| 6,233,575 | B1 | * | 5/2001 | Agrawal |

(Continued)

OTHER PUBLICATIONS

Goldman et al., "Knowledge Discovery in an Earthquake Text Database: Correlation Between Significant Earthquakes and the Time of Day", IEEE pp. 12-21, 1997.*

(Continued)

*Primary Examiner*—Cheryl Lewis
(74) *Attorney, Agent, or Firm*—McGinn IP Law Group, PLLC; Leonard Guzman, Esq.

(57) ABSTRACT

A method and system for interesting relationships in text documents includes generating a dictionary of keywords in the text documents, forming categories of the text documents using the dictionary and an automated algorithm, counting occurrences of the structured variables, categories and structured variable/category combinations in the text documents, and calculating probabilities of occurrences of the structured variable/category combinations.

23 Claims, 17 Drawing Sheets

U.S. PATENT DOCUMENTS

| | | | |
|---|---|---|---|
| 6,236,768 B1 * | 5/2001 | Rhodes | |
| 6,301,577 B1 * | 10/2001 | Matsumoto | |
| 6,374,251 B1 * | 4/2002 | Fayyad | |
| 6,424,971 B1 * | 7/2002 | Kreulen | |
| 6,556,958 B1 * | 4/2003 | Chickering | |
| 6,584,456 B1 * | 6/2003 | Dom | |
| 6,609,124 B2 * | 8/2003 | Chow | |
| 6,611,825 B1 * | 8/2003 | Billheimer | |
| 6,618,725 B1 * | 9/2003 | Fukuda | |
| 6,654,739 B1 * | 11/2003 | Apte | |
| 6,701,305 B1 * | 3/2004 | Holt | |
| 6,718,367 B1 * | 4/2004 | Ayyadurai | |
| 6,751,621 B1 * | 6/2004 | Calistri-Yeh | |
| 6,778,995 B1 * | 8/2004 | Gallivan | |
| 6,804,688 B2 * | 10/2004 | Kobayashi et al. | 1/1 |
| 2002/0156810 A1 | 10/2002 | Holland et al. | |
| 2003/0033274 A1 | 2/2003 | Chow et al. | |
| 2003/0167163 A1 | 9/2003 | Glover et al. | |
| 2004/0093331 A1 | 5/2004 | Garner et al. | |
| 2004/0243561 A1 | 12/2004 | Cody et al. | |
| 2005/0022115 A1 | 1/2005 | Baumgartner et al. | |

OTHER PUBLICATIONS

Goldszmidt et al., "A Probabilistic Approach to Full-Text Document Clustering", Technical Report ITAD-433-MS-98-044, SRI International, 1998.*

Goldman Time et al.,"Knowledge Discovery in an Earthquake Text Database: Correlation between Significant Earthquakes and the Time of Day", In "Statistical and Scientific Database ManManagement", pp. 12-21,1997.

Singh et al.,"Rethinking the Presentation of Results From Web Search", In: Multimedia and Expo, 2005. ICME 2005. IEEE, Jun. 6-Jul. 2005, pp. 1492 -1495.

Chien et al.,"Semantic Similarity Between Search Engine Queries", WWW 2005, May 10-14, 2005 pp. 2-11.

Shyu et al.,"Affinity-Based Similarity Measure for Web Document Clustering", Univ. of Miami, date unknown.

Author unknown,"Details of Clustering Algorithms", downloaded from http://maya.cs.depaul.edu/~classes/ds575/clustering/CL-alg-details.html, Jun. 27, 2005.

Rasmussen et al., "wCLUTO: A Web-Enabled Clustering Toolkit", Univ. of Minnesota, date unknown.

Zhao et al, "Evaluation of Hierarchical Clustering Algorithms for Document Datasets", ACM, 2002.

Pons-Porrata et al., "Detecting events and topics by using temporal references", 2002.

J. Allan et al, "Topic Detection and Tracking Pilot Study Final Report", Feb. 1998, Proc. of the DARPA Broadcast News Transcription and Understanding Workshop.

M. Goldszmidt et al., "A Probabilistic Approach to Full-Text Document Clustering", 1998, SRI International.

M. Sahami, "Using Machine Learning to Improve Information Access", copyright date unknown, CompSci, Stanford Univ, used for background information only.

I. Dhillon et al., "Efficient Clustering of Very Large Document Collections", in Data Mining for Scientific and Engineering Applications",Kluwer Academic Publishers", 2001 used for background information only.

A. Popescul et al, "Clustering and Identifying Temporal Trends in Document Databases", 2000, In Proc. IEEE Advances in Digital Libraries, used for background information only.

Y. Yang et al., "Learning Approaches for Detecting and Tracking NEws Events", 1999, IEEE Intelligent Systems.

Y. Yang et al., "A Study of Retrospective and On-Line Event Detection", SIGR 1998 Mebourne Australia, used for background information only.

J. Allan et al., "On-Line New Event Detection and Tracking", 1998, SIGR'98 Mebourne Australia, ACM used for background information only.

J. Makkonen et al., "Utilizing Temporal Information in Topic Detection and Tracking", Univ. of Helsiki, Dept. of CompSci, Aug. 19, 2003, used for background information only.

M. Andrade et al., "Automatic extraction of keywords from scientific text: application to the knowledge domain of protein families", Protein Design Group, CNB-CSIC, May 15, 1998 used for background information only.

Roddick et al., "A Bibliography of Temporal, Spatial and Spatio-Termoral Data Mining Research", Aug. 1999, ACM, used as background.

Ma et al., "Online Novelty Detection on Temporal Sequences", 2003, ACM, used as background.

* cited by examiner

```
for(int i=0; i<total; i + +) {
        SparseMatrixRow smr = t.getData(i);
            dictionIndex = smr.positions;
            cat=getCat(i, granularity);
            categoryPos = ((Integer)categoryHash.get(cat)).intValue();
            categoryCount[categoryPos] + +;
        for(int j=0; j<dictionIndex.length; j + +) {
            variablePos = dictionIndex[j];
            counter[variablePos][categoryPos] + +;
            variableCount[variablePos] + +;
        }
    }
```

FIG.2

| Example | Dictionary Term | Category | Count |
|---|---|---|---|
| 16 | requested | Install Request | 1 |
| 16 | reset | Lotus Notes | 1 |
| 16 | afs | AIX | 1 |
| 16 | password | VM | 3 |
| 17 | www | AFS | 1 |
| 17 | release | Refresh | 1 |
| 18 | adsm | ADSM | 1 |
| 18 | password | VM | 4 |

FIG.3

```
Vector v = new Vector ( );

for(int 1=0; i<variableSize; i++){
    for(int j=0; j<categorySize; j++){
        //if the expected number of combinations within a given cluster and data is less than the actual
        if((categoryCount[ j ] * variableCount [ i ])/total < counter [ i ] [ j ] ){
            //do Chi function
            probability [ i ] [ j ] = ChiSquared.prob(total, categoryCount [ j ], variableCount [ i ], counter [ i ] [ j ]);
        }
        //if the expected number of combinations within a given cluster and date is more than the actual
        else{
            probability [ i ] [ j ] = 1.0;
        }
        if (probability [ i ] [ j ] < probabilityThresh && counter[ i ] [ j ] > confidenceThresh){
            v.addElement(new EventMarker(variableName [ i ], category [ j ], probability [ i ] [ j ], variableCount [ i ],
            }
        }
    }
}
```

FIG.4

| | Keywords | Category | Probability | Keyword Count | Category Count | Keyword + Cate |
|---|---|---|---|---|---|---|
| 62 | command | AIX | 0.0000 | 170 | 452 | 102 |
| 63 | wordpro | Smartsuite (L... | 0.0000 | 22 | 50 | 11 |
| 64 | customized | Printing | 0.0000 | 125 | 955 | 125 |
| 65 | page | Refresh | 0.0000 | 228 | 31 | 28 |
| 66 | unable | Printing | 0.0000 | 334 | 955 | 228 |
| 67 | install-customz... | Printing | 0.0000 | 122 | 955 | 122 |
| 68 | autoproxy | Netscape | 0.0000 | 15 | 77 | 11 |
| 69 | password-dce | AFS | 0.0000 | 52 | 266 | 39 |
| 70 | connect-network | Networking | 0.0000 | 64 | 299 | 46 |
| 71 | jobs | Printing | 0.0000 | 121 | 955 | 119 |
| 72 | reset-adsm | ADSM | 0.0000 | 9 | 94 | 9 |
| 73 | connect | Networking | 0.0000 | 262 | 289 | 98 |
| 74 | page-dce | AFS | 0.0000 | 34 | 266 | 30 |
| 75 | rebuilt | Install Request | 0.0000 | 19 | 109 | 14 |
| 76 | p340ua | Printing | 0.0000 | 113 | 955 | 111 |
| 77 | ign | Remote Access | 0.0000 | 40 | 61 | 15 |
| 78 | smart | Smartsuite (L... | 0.0000 | 11 | 50 | 7 |
| 79 | print-successfully | Printing | 0.0000 | 104 | 955 | 104 |
| 80 | password-afs | AFS | 0.0000 | 46 | 268 | 34 |
| 81 | softdist | AFS | 0.0000 | 53 | 452 | 48 |
| 82 | web page | AFS | 0.0000 | 102 | 268 | 52 |

FIG.5

```
category/Hash = new Hashtable ();
int position = 0;
        Object obj = getCat(i, granularity);

if (categoryHash.get(obj) = = null) {
          categoryHash.put(obj, new Integer (position));
          position + +;
            }
        }
Enumeration e = categoryHash.keys();
        while (e.hasMoreElements()) {
            Object oo = e.nextElement();
            Integer z = (Integer)categoryHash.get(oo);
            category[z.intValue()] = oo;
}
```

FIG.9

```
for(int i=0; i<total; i + +){
    if (discovery.equals("class") ) {
      variablePos = t.membership[i];
      variableCount[variablePos] + +;
      cat = getCat(i, granularity);
      categoryPos = ((Integer)categoryHash.get(cat)).intValue();
      counter[variablePos][categoryPos] + +;
      categoryCount[categoryPos] + +;

}
    if (discover.equals("dictionary") ) {
      SparseMatrixRow smr = t.getData(i);
      dictionIndex = smr.positions;
      cat = getCat (i, granularity);
      categoryPos = ((Integer)cagegoryHash.get(cat)).intValue();
      categoryCount[categoryPos] + +;

for(int j=0;  j <dictionIndex.length;  j + +){
        variablePos = dictionIndex[j];
        counter[variablePos][categoryPos] + +;
        variableCount[variablePos] + +;

| Example# | Keyword | Date (weekly) | Counter |
|---|---|---|---|
| 12 | info | Sun Jan 11 00:00:00 PST 1998 | 1 |
| 12 | log | Sun Jan 11 00:00:00 PST 1998 | 1 |
| 12 | access | Sun Jan 11 00:00:00 PST 1998 | 1 |
| 12 | home | Sun Jan 11 00:00:00 PST 1998 | 1 |
| 12 | home | Sun Jan 11 00:00:00 PST 1998 | 1 |
| 13 | process | Sun Jan 11 00:00:00 PST 1998 | 1 |
| 13 | load | Sun Jan 11 00:00:00 PST 1998 | 1 |
| 13 | lost | Sun Jan 11 00:00:00 PST 1998 | 1 |
| 13 | explorer | Sun Jan 11 00:00:00 PST 1998 | 1 |
| 13 | info | Sun Jan 11 00:00:00 PST 1998 | 2 |
| 13 | disk | Sun Jan 11 00:00:00 PST 1998 | 2 |
| 14 | ip | Sun Jan 11 00:00:00 PST 1998 | 1 |
| 14 | getting | Sun Jan 11 00:00:00 PST 1998 | 1 |
| 14 | system | Sun Jan 11 00:00:00 PST 1998 | 4 |
| 14 | work | Sun Jan 11 00:00:00 PST 1998 | 2 |
| 14 | working | Sun Jan 11 00:00:00 PST 1998 | 2 |

FIG.11

```
1.    Vector v = new Vector();
2.    for(int i = 0; i < variableSize; i++) {
3.         //if the expected number of examples within a given cluster and date is less than the actual
4.         if((categoryCount[ j ] * variableCount[ i ])/total < counter[ i ][ j ]
      ){
5.              //do Chi function
6.              probability[ i ][ j ] = chi.prob(total, categoryCount[ j ], variableCount[ i ],
                  counter[ i ][ j ]);
           }
           //if the expected number of examples within a given cluster and date is more than the actual else{
7.              probability[ i ][ j ] = 1.0;
           }
           if(probability[ i ][ j ] < probabilityThresh && counter[ i ][ j ] >confidenceThresh) {
8.              v.addElement(new EventMarker(variableName[ i ], category[ j ], probability[ i ][ j ],
                  variableCount [i], categoryCount[j], counter[i][j])
                );
           }
      }
```

FIG.12

```
public class EventMarker{

String variable = null;
    Object category = null;
    double probability = 0;
    int totalVariable;
    int totalCat;
    int total;

public EventMarker(String variableID, Object categoryID, double probID, int totalVariableID, int totalCatID, int total_____ variable = variableID;
            category = categoryID;
            probability = probID;
            totalCat = totalCatID;
            total = totalID;
    }
}
```

FIG.13

| | Keywords | Date | Probability | Keyword Count | Category Count | Keyword + Date |
|---|---|---|---|---|---|---|
| 1 | newtext | Feb 1998 | 0.0000 | 38 | 557 | 37 |
| 2 | visiblesolution | Feb 1998 | 0.0000 | 38 | 557 | 37 |
| 3 | solution | Feb 1998 | 0.0000 | 64 | 557 | 37 |
| 4 | project | Jun 1998 | 0.0000 | 30 | 674 | 23 |
| 5 | pay | Mar 1998 | 0.0000 | 21 | 738 | 18 |
| 6 | refresh | Jun 1998 | 0.0000 | 65 | 674 | 30 |
| 7 | callup | Mar 1998 | 0.0000 | 56 | 738 | 28 |
| 8 | elimination | Jul 1998 | 0.0000 | 24 | 586 | 15 |
| 9 | bringing | Jun 1998 | 0.0000 | 15 | 674 | 12 |
| 10 | chapdelaine | Jun 1998 | 0.0000 | 11 | 674 | 10 |
| 11 | hernandez | Dec 1998 | 0.0000 | 20 | 358 | 10 |
| 12 | setpasswd | Jan 1998 | 0.0000 | 36 | 471 | 16 |
| 13 | named | Jan 1998 | 0.0000 | 36 | 471 | 16 |
| 14 | netdoor | Jun 1998 | 0.0000 | 90 | 674 | 34 |
| 15 | arcprt02 | Jul 1998 | 0.0000 | 51 | 586 | 22 |
| 16 | d03nm041 | May 1998 | 0.0000 | 81 | 483 | 26 |
| 17 | p3116h2a | Oct 1998 | 0.0000 | 20 | 534 | 12 |
| 18 | arcprt03 | Sep 1998 | 0.0000 | 20 | 455 | 11 |
| 19 | base | Mar 1998 | 0.0000 | 33 | 738 | 19 |
| 20 | rebecca | Dec 1998 | 0.0000 | 66 | 358 | 19 |
| 21 | rebecca | Dec 1998 | 0.0000 | 65 | 358 | 19 |

FIG.14

METHOD AND SYSTEM FOR IDENTIFYING RELATIONSHIPS BETWEEN TEXT DOCUMENTS AND STRUCTURED VARIABLES PERTAINING TO THE TEXT DOCUMENTS

This application is a Continuation Application of U.S. patent application Ser. No. 09/837,158 which was filed on Apr. 19, 2001 now U.S. Pat. No. 7,155,668.

BACKGROUND OF THE INVENTION

1. Field of the Invention

The present invention generally relates to a method and system for analyzing text documents and more specifically, to a method and system for automatically identifying relationships between text documents and structured variables pertaining to those text documents.

2. Description of the Related Art

Unstructured free form text documents are commonly analyzed to discover interesting correlations between structured variables (e.g., a time interval) and categories of text documents (e.g., text documents in which a particular keyword occurs). For instance, if the text documents include "problem tickets" in a helpdesk log from a computer support center, the text might be analyzed to discover correlations between a particular month and all text documents containing the keyword "computer model XXX".

However, conventional methods of analyzing text documents typically do not automatically identify interesting relationships between the text documents and structured variables. Instead, words and phrases which frequently occur in the text documents are plotted on a graph and users are required to determine for themselves whether an interesting relationship exists. Of course, this is a labor intensive and time consuming process.

One conventional method for analyzing text documents is disclosed in U.S. Pat. No. 5,371,673 to Fan, incorporated herein by reference. The Fan method is intended to sort and score text in order to determine public opinion for specified positions on a specified issue based on information available to the public. The method requires a computer, printer and modem and uses information in the Associated Press (AP) wire service to determine expected public opinion. The method first gathers relevant AP stories. The issue (e.g., "should defense spending be increased, kept the same or decreased?") and positions (e.g., "it should be increased") are defined. The user then enters a search command (e.g., DEFENSE or MILITARY or ARMS) to cause the computer to use the modem to search remote databases (e.g., Nexis®) for stories relevant to the issue, retrieve the stories and store them on disk. The computer then edits extraneous characters out of the text.

A set of numerical scores is then generated. The text is "filtered" in a series of steps to remove irrelevant text and "scored" using a text analysis dictionary, a set of text transformation rules and text scoring rules.

Lastly, public opinion is computed. Here, the data is stored in an array which is chronologically sorted by the computer, from the earliest story to the latest. The user then enters results of actual public opinion polls which are stored in an "opinion array" which has as its elements the time of the poll and the subpopulation holding a certain position (e.g., "defense spending should be increased"). The computer then refines this data and applies a set of population conversion rules to calculate public opinion as a time trend.

Thus, the Fan method generates structured data (e.g., public opinion) from unstructured data (e.g., AP text stories). However, the method does not automatically determine interesting relationships such as, for example, statistically significant relationships, between the AP text stories and public opinion. In other words, the Fan method, like other conventional methods, does not automatically identify interesting relationships between text documents and structured variables pertaining to the text documents.

SUMMARY OF THE INVENTION

In view of the foregoing and other problems of the conventional systems and techniques, it is an object of the invention to provide a method and system for automatically identifying interesting (e.g., statistically significant) relationships between text documents and structured variables pertaining to the text documents. For purposes related hereto, the term "interesting" should be interpreted to include any relationship which a user may find informative.

It is another object of the invention to provide a method and system for automatically identifying interesting time dependent relationships within the text documents.

It is another object of the invention to provide a computer implemented method for automatically identifying interesting relationships, including time dependent relationships, in text documents.

In a first aspect of the present invention, the claimed method for automatically identifying interesting relationships in text documents includes generating a dictionary of keywords in the text documents, forming categories of the text documents using the dictionary and an automated algorithm, counting occurrences of the structured variables, categories and structured variable/category combinations in the text documents, and calculating probabilities of occurrences of the structured variable/category combinations. The inventive method may, therefore, calculate a probability that a given co-occurrence of a structured variable and a category would have occurred as a purely random event. The structured variables may include, for example, predetermined time intervals such as days, weeks or months.

The automated algorithm may include, for example, a keyword occurrence algorithm where each of the categories includes a category of text documents in which a particular keyword occurs. On the other hand, the automated algorithm may include a clustering algorithm such as a k-means clustering algorithm where each of the categories includes a cluster of text documents. In addition, if the clustering algorithm is used, forming categories may include inputting a predetermined number of categories (e.g., 30 or 100).

Further, forming categories of text documents may include forming a sparse matrix array containing the counts of each of the keywords in each of the text documents.

In addition, the keywords may include words or phrases which occur a predetermined number of times in said text documents. Thus, the user may control the extent of the keyword dictionary. Further, the dictionary may be generated by first parsing text in the text documents to identify and count occurrences of words, storing a predetermined number of frequently occurring words, second parsing text in the text document to identify and count occurrences of phrases, and storing a predetermined number of frequently occurring phrases.

For convenience, frequently occurring words and phrases may be stored in a hash table. In addition, where the text documents are categorized by keyword occurrence, the categories may be formed by third parsing text in the text documents to count the number of times that the words and phrases occur in each text document.

Further, the probabilities of occurrence may be determined using a chi squared function which is well-known in the art. In addition, the interesting relationships may include structured variable/category combinations having a lowest probability of occurrence.

In another aspect of the present invention, a system for automatically identifying relationships between text documents and structured variables pertaining to the text documents may include an input device for inputting text documents, a processor for forming categories of the text documents and counting occurrences of said structured variables, categories and structured variable/category combinations and calculating probabilities of occurrences of said structured variable/category combinations, and a display, for displaying the probabilities. The inventive system may further include a memory for storing occurrences of structured variables, categories and structured variable/category combinations and probabilities of occurrences of the structured variable/category combinations. As noted above, the structured variables may include predetermined time intervals such as days, weeks or months. The system may, therefore calculate a probability that a given co-occurrence of a structured variable and a category would have occurred as a purely random event.

In another aspect of the present invention, a programmable storage medium tangibly embodying a program of machine-readable instructions executable by a digital processing apparatus to perform the inventive method.

With it unique and novel features, the inventive method and system may automatically identify interesting relationships, including time dependent relationships, between structured variables and categories of text documents. Moreover, unlike conventional systems and methods where the user was required to search through a graph to discover interesting relationships, the inventive system and method automatically discover the interesting relationships for the user. Thus, the inventive method and system do not require a significant investment of human resources to extract meaningful features from text documents which is required by conventional systems and methods.

BRIEF DESCRIPTION OF THE DRAWINGS

The foregoing and other objects, aspects and advantages will be better understood from the following detailed description of a preferred embodiment of the invention with reference to the drawings, in which:

FIG. 2 shows an example of computer code that may be used to count occurrences of structured variables, categories and structured variable/category combinations according to the present invention;

FIG. 3 shows an example of a table containing the occurrences of structured variable/category combinations counted that may be generated using the computer code of FIG. 2 in eClassifier® software according to the present invention;

FIG. 4 shows an example of computer code that may be used to calculate probabilities of occurrences of structured variable/category combinations according to the present invention;

FIG. 5 shows a table generated using eClassifier® software and which displays the probabilities of occurrence of structured variable/category combinations according to the present invention;

FIG. 9 shows an example of computer code that may be used to count occurrences of predetermined time intervals and categories according to the present invention;

FIG. 10 shows an example of computer code that may be used to count occurrences of predetermined time interval/category combinations according to the present invention;

FIG. 11 shows a table containing the occurrences of predetermined time interval (i.e., weekly interval)/category combinations counted that may be generated by using eClassifier® software according to the present invention;

FIG. 12 shows an example of computer code used to calculated probabilities of occurrences of predetermined time interval/category combinations according to the present invention;

FIG. 13 shows an example of computer code used to record probabilities of occurrences of predetermined time interval/category combinations according to the present invention;

FIG. 14 shows a table generated using eClassifier® software and which displays the probabilities of occurrence of predetermined time interval/category combinations according to the present invention;

DETAILED DESCRIPTION OF PREFERRED EMBODIMENTS OF THE INVENTION

Figure 1:
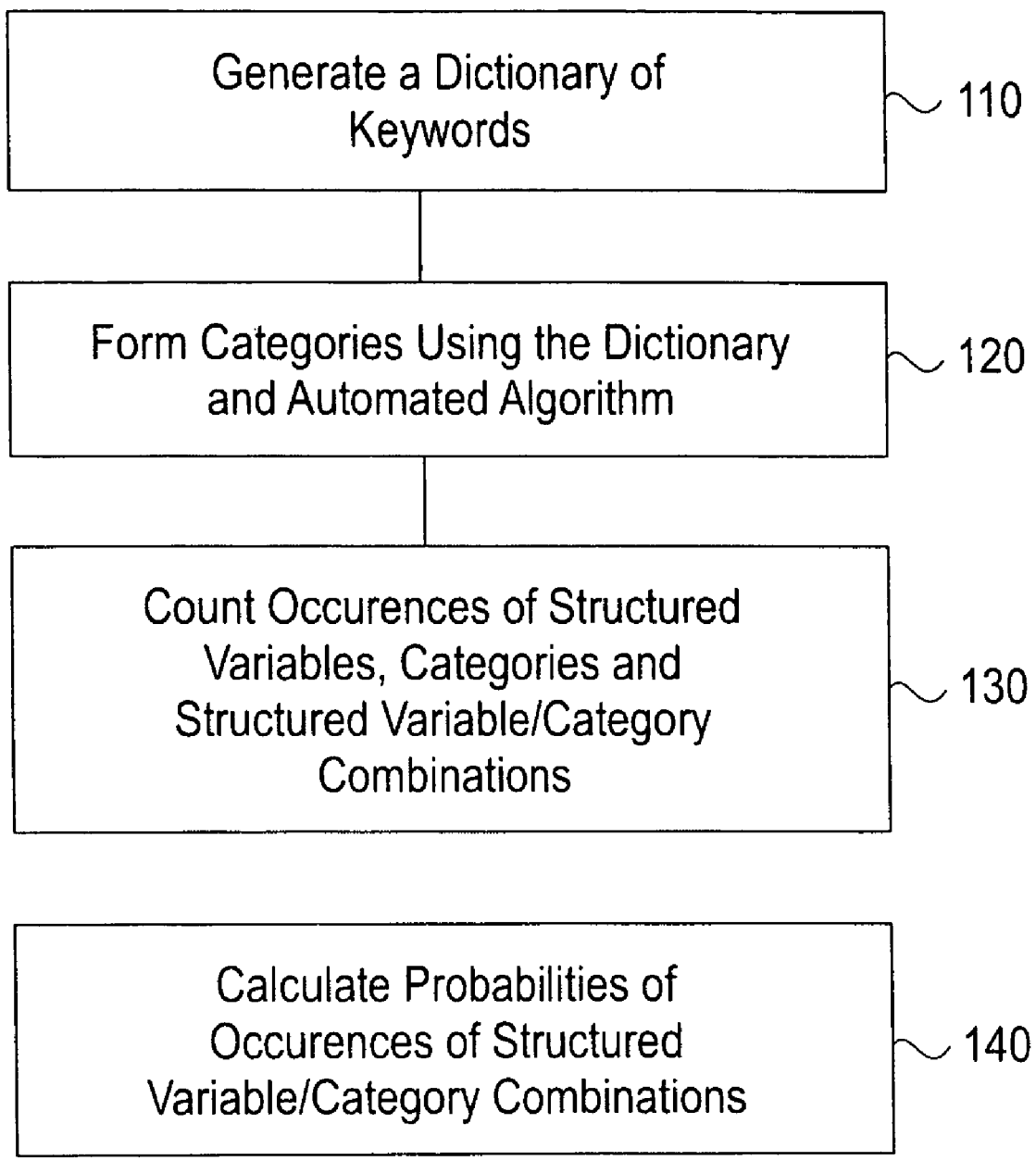
FIG. 1 illustrates a method 100 for analyzing text documents according to the present invention.

Referring now to the drawings, FIG. 1 illustrates a method for automatically identifying interesting relationships between text documents and structured variables pertaining to the text documents.

As shown in FIG. 1, the inventive method 100 first generates (110) a dictionary of frequently occurring words and phrases. More specifically, the text in the text documents is parsed to find all unique words and how often they occur. The N most frequently occurring words may be retained in a hash table. The text may then be parsed a second time to find the N most frequently occurring phrases which are defined to be co-occurrence of words already in the hash table. The N most frequently occurring words and phrases may, therefore, be identified as keywords and retained and stored to form the dictionary. Note that "keyword" as used herein should not be limited to one word but may include a phrase or a plurality of words. For example, the dictionary generated in the inventive method 100 may include the keyword "hard drive".

The inventive method 100 may use this dictionary and an automated algorithm to form (120) categories of the text documents in the text corpus. For example, the inventive method 100 may categorize the text documents according to keyword occurrence. That is, a "category" of text documents containing a particular keyword is formed and each text document may be classified according to whether it is in that category.

Alternatively, the text documents may be categorized via a clustering algorithm (e.g., a k-means algorithm using cosine similarity over the word frequency distributions) or via a document categorization scheme provided as a class identification token with each document. The inventors have found that the k-means algorithm is especially fast and easy to implement. The k-means algorithm produces a set of disjoint clusters and a normalized centroid for each cluster that represents the cluster mean normalized to have unit Euclidean norm. The normalized centroids may be used to label each cluster—by using the three (or more) words that have the largest weight in the normalized centroid vector. Therefore, a "category" of text documents containing a particular cluster may be formed and each text document may be categorized according to whether it is in that cluster.

Further, forming (120) categories of text documents may include forming a sparse matrix array. This array may contain the counts of each of the keywords in each of the text documents. In other words, the array may contain the same data regardless of how the text documents are categorized.

Further, the sparse matrix may be formed by parsing the text documents a third time, searching for each keyword seen in the text against a hash table containing the keywords hashed to a unique integer ID. A list of integers that indicates which keyword occurs in the document may be saved for each document. The set of all such integer lists can be thought of, for example, as the sparse matrix array having as many rows as there are text documents and as many columns as there are keywords.

The inventive method 100 may use the sparse matrix array to identify interesting relationships between structured variables and categories of text documents. The structured variable may be, for example, a predetermined time interval (e.g., a day, week or month) or a temperature or any other structured variable. The inventive method 100 may identify interesting relationships by calculating the probability of a combination of the structured variable and a category of text documents occurring. In other words, it calculates the probability that a particular co-occurrence of a category of text documents and a structured variable would have occurred as a purely random event. For example, if 95% of all computer helpdesk problem tickets in which the keyword "hard drive" occurred (i.e., the category of text documents) were created during July 1998 (i.e., the structured variable) the relationship may be interesting to the user.

Further, the lower the probability of the occurrence of the structured variable/category combination, the more interesting (e.g., statistically significant) the combination (i.e., relationship) may be. For example, if the probability of text documents containing the keyword "hard drive" during July 1998 was high, the combination (i.e., relationship) may not be considered interesting by the user, in spite of the fact that 95% of problem tickets containing "hard drive" were created during July 1998.

The inventive method 100 may identify interesting relationships between the structured variables and categories of text documents by first counting (130) all occurrences of structured variables, categories and structured variable/category combinations. Thereafter, the inventive method 100 calculates (140) the probabilities of occurrences of the structured variables, the categories and the structured variable/category combinations by using, for example, the Chi Squared function as described in the book *Numerical Recipes in C, 2nd Edition*, by Teukolsky, Vettering, and Flannery, pp. 216-222, 1995 Ed. This function takes in the total number of text documents, total occurrences of each structured variable, total occurrences of each category of text documents, and total occurrences of structured variable/category combinations. A float value is returned which represents the probability that a combination will occur, given the total number of text documents and the total number of occurrences of that structured variable and category.

Further, the user may predetermine probability and confidence thresholds so that information may be stored into a vector only if it is under the predetermined probability and confidence thresholds. The inventive method may calculate the expected number of combinations by multiplying the total occurrences of the structured variable by the total occurrences of the category and dividing the product by the total number of text documents. If the expected number of combinations is more than the actual, then the probability is set to equal 1.0 (because such combinations are usually not considered interesting).

Further, the inventive method 100 may be easily and efficiently implemented using a computer system (e.g., as exemplarily described below and shown in FIG. 9). For example, the visual and interactive software eClassifier® was developed by the assignee and has been successfully used to implement the inventive method 100 on a computer system. The eClassifier® software may be written in Java® and utilize a Java® Foundation Class (Swing) style user interface. Further, the software provides features for manually refining the keyword dictionary to eliminate meaningless entries.

For example, the computer system may be used to execute an instruction code containing loops to count the above-mentioned occurrences of structured variables, categories and structured variable/category combinations. For instance, such an instruction code is shown in FIG. 2.

As shown in FIG. 2, the variable 'total' represents the total number of text documents, the 'categoryPos' represents the position of the category (which was previously saved in the 'categoryHash' table), and the "variablePos" represents the position of the structured variable. Further, the occurrences may be also recorded in the structured variable 'counter' which increments each time a certain categoryPos and variablePos have a combined occurrence.

For example, using such a computer code in the eClassifier® software to analyze computer helpdesk problem tickets, the inventors generated the table shown in FIG. 3. Thus, it can be seen in FIG. 3 that the counter was incremented when the word 'password' and the category VM occurred together.

Further, a computer system may be used to calculate the probabilities of occurrence. This may be done, for example, by applying the data generated from the computer code in FIG. 2 (i.e., 'total' (total number of text documents), 'variableCount' (total occurrences of each structured variable), 'categorycount' (total occurrences of each category), and 'counter' (total occurrences of structured variable/category combinations)) to the Chi Squared function.

For example, a computer system may calculate the probabilities in this manner by executing the instruction code as shown in FIG. 4.

Furthermore, using the eClassifier® software to implement the inventive method, the inventors were able to generate a data table which allows the results to be easily viewable. For example, using eClassifier® to analyze helpdesk problem tickets, the table shown in FIG. 5 was generated.

Figure 6:
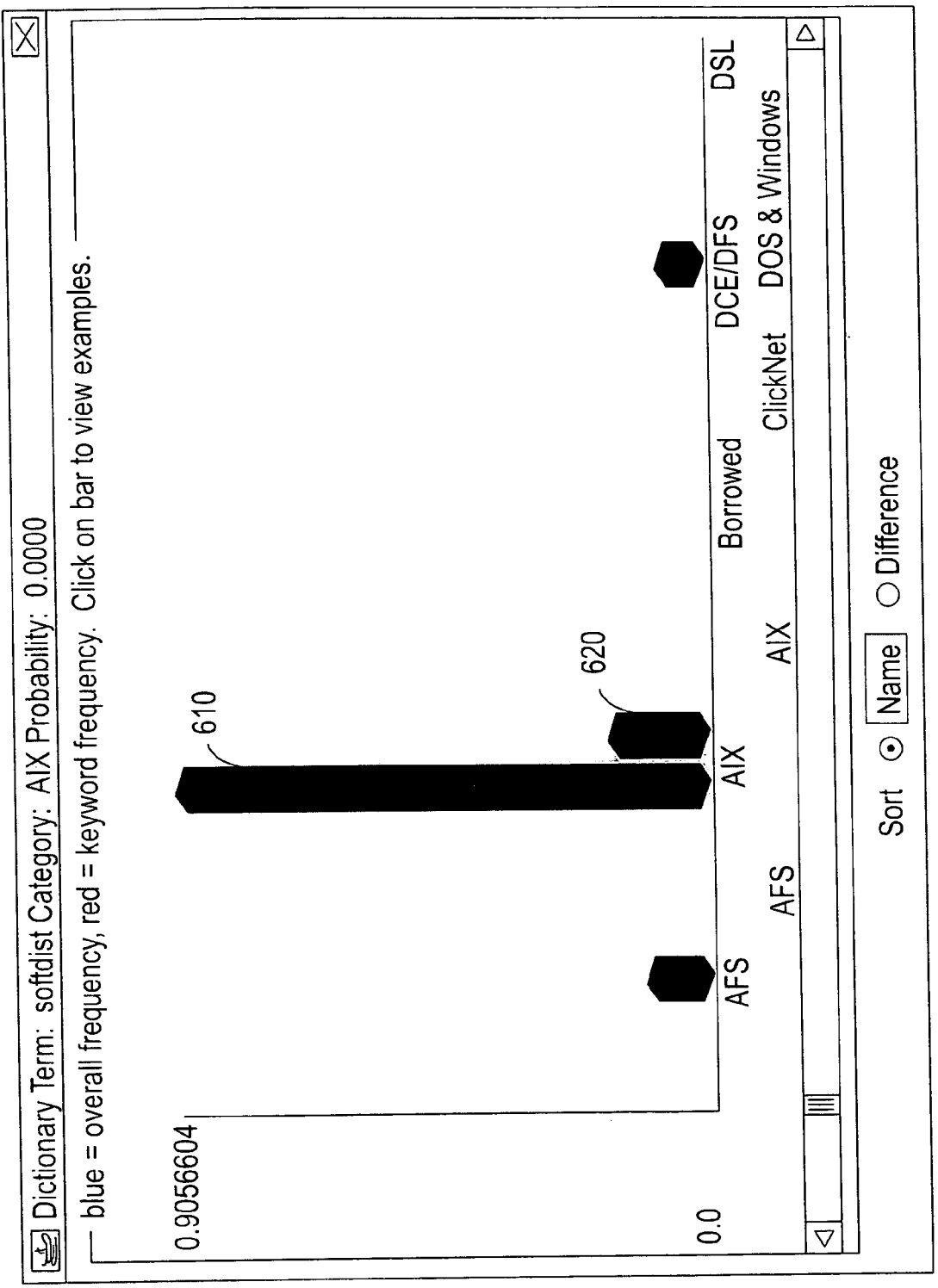
FIG. 6 shows a bar graph which was generated using eClassifier® software and which shows the occurrences of structured variable/category combinations according to the present invention.

Furthermore, using the eClassifier® data, the inventors placed the data in the form of a bar graph for easier identification of interesting relationships between the structured variables and the categories of text documents. For example, as shown in FIG. 6, to study the interesting relationships involving the keyword "softdist" the user may select the highlighted row in FIG. 5. This generates a bar graph displaying the occurrences of the keyword in this category versus other keywords as shown in FIG. 6. Here, the long bar 610 indicates that there are many occurrences of the combination of "softdist" with the category "AIX" compared to the occurrences of "softdist" over the entire data set which is indicated by the short bar 620.

Figure 7:
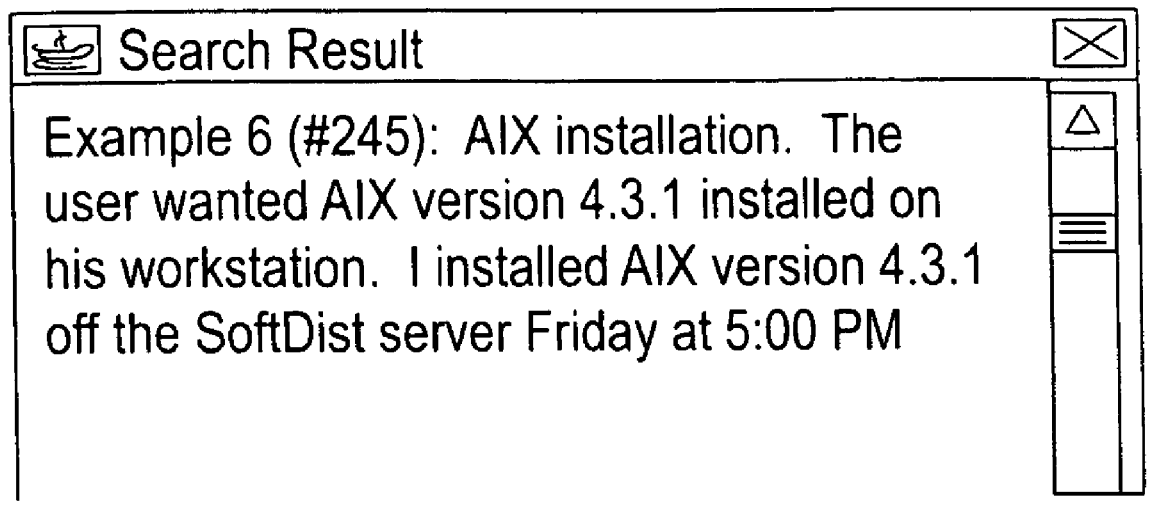
FIG. 7 shows a computer screen which was generated using eClassifier® software and which shows a text document for allowing a user to investigate why an interesting relationship has occurred according to the present invention.

In addition, using the eClassifier® software, the inventors were able to make each occurrence of a combination isolated and easily accessible for individual study by the user. That is, the user may select a bar in the bar graph of FIG. 6 to examine each individual problem ticket and discover why an interesting relationship has occurred. For example, by selecting the long bar 610 in FIG. 6, the user may be able to view the problem tickets having the combination of "softdist" with the category "AIX". Thus, as shown in FIG. 7, one problem ticket indicated that there was a problem with AIX installation and to fix this the Softdist server was used.

Thus, the inventive method 100 provides the user with a list of interesting relationships that is easily acquired and does not require the user to manually sort through graphs searching for interesting relationships between text and categories.

Although, the claimed method has been described herein as it has been implemented with the software tool eClassifier®, this should not be considered limiting and the inventors note that the claimed method may be performed by any other means (e.g., other software tools) capable of performing the various steps of the claimed method.

In particular, the inventive method 100 may be used to identify interesting relationships between a predetermined time interval (e.g., a day, week or month) and a category of text documents. In other words, as mentioned above, the structured variable in the inventive method 100 may include a predetermined time interval. The inventive method 100 may, therefore, be used to discover time dependencies within the text documents by calculating the probability that a particular co-occurrence of a category of text documents and a predetermined time interval would have occurred as a purely random event.

The inventive method 100 may be useful, for example, in determining time dependencies in computer helpdesk problem tickets. Common relationships may be, for example, a server malfunctioning, a network "crashing" on a given day or a software license expiring on a given month. Without the inventive method 100, a user would have to visually inspect a table or graph of data to find interesting co-occurrences.

Referring again to FIG. 1, the inventive method 100 includes generating (110) a keyword dictionary and forming (120) categories of text documents. As noted above, the text documents can be categorized, for example, by keyword occurrence, via a clustering algorithm such as a k-means algorithm using cosine similarity over the word frequency distributions, or via a document classification scheme provided as a class identification token with each document.

Further, forming (120) categories of text documents may include forming a sparse matrix array. This array may contain the counts of each of the keywords in each of the text documents. In other words, the array may contain the same data regardless of how the text documents are categorized. Further, the sparse matrix may be formed by parsing the text documents a third time as explained above.

The inventive method 100 counts (130) the dates to determine how often a particular category of text documents occurred during a particular time interval or on a particular date. The results of the counting (130) may be stored, for example, in a hash table that keeps track of the dates as an object. The length of the hash table may be, for example, the total number of different dates. Every date may be given a number that represents its position. For every category that occurs on a given date (or over a given time interval), the counter is increased at the respective array slot. The result, therefore, is a table containing the number of time that the predetermined time interval occurred, the number of times each document category occurred, and how often each predetermined time interval/category combination occurred.

Further, the user may be able to select the granularity of the time interval to be studied (e.g. monthly, weekly, or daily), as well as choose the threshold of probability that makes a time dependency "interesting" (e.g. 0.05, 0.01, or 0.001).

As noted above, the inventive method 100 may use the occurrences counted to calculate (140) the probabilities of a category occurring on a particular date or over a particular time interval. As noted above, this may be performed, for example, by applying the Chi squared function for those occurrences whose expected value is less than the actual. The expected value may be calculated using statistical formulas by dividing the product of the total count for the dates and the total counts for the categories by the total amount of text documents. For the Chi squared function, four parameters are input, the total number of text documents, the number of occurrences of a particular date or time interval, the number of occurrences of a category of text documents, and a number of occurrences of that particular category of text documents on that particular date or over that certain time interval. The Chi squared function may, therefore, return the probability of the category occurring on a given date or over a given time interval compared to the total number of occurrences of the category generally.

Further, as noted above, in the inventive method 100, the user may select probability and confidence thresholds so that information may be stored into a vector only if it is under the predetermined probability and confidence thresholds. The lower the probability the user chooses, the higher the threshold. The higher the confidence level (i.e., the number of occurrences of a category of text documents on a particular date or over a particular time interval) the higher the threshold.

Therefore, using the inventive method 100, the user may generate a data table identifying the high occurrence of a category on a particular date as compared to all other categories occurring on that particular date. The user may, thereby, easily view time dependency data for the text documents.

Further, the inventive method 100 may be effectively and efficiently implemented by a computer system using, for example, the eClassifier® software. For example, as shown in the graphical user interface (GUI) of FIG. 8, using the eClassifier® software, the user may select the granularity of the time interval to be studied as well as choose the threshold of probability that makes a time dependency "interesting." After selecting these parameters, the user may select start to begin the calculations. A progress bar may be used to show the status of the calculations while the user waits.

Further, the computer system may be used to execute an instruction code containing loops to count the above-mentioned occurrences of the categories for each date. For instance, such an instruction code is shown in FIG. 9.

The code shown in FIG. 9 creates a hash table to keep track of the dates and text documents. As noted above, the length of the hash table may be the total number of different dates. Further, every date may be given a number that represents its position. Further, after the "for" loop is finished, the computer system may execute a "while" loop to store the important dates in an object array.

After the information is recorded in the hash table, the computer system may be used to count the dates. For every category of text documents that occurs on a given date, the counter is increased at the respective array slots. For example, the dates may be counted by executing the computer code shown in FIG. 10.

For example, if the inventive method 100 is used to analyze computer helpdesk problem tickets, the computer code may generate the data table shown in FIG. 11.

It can be seen in FIG. 11 that the keyword 'info' occurred once on Jan. 11, 1998 in Example # 12. The keyword occurred again in Example # 14 on Jan. 11, 1998, so the counter position increased by one. It can also be seen that 'system' occurred at least 4 times in different text documents that occurred on Jan. 11, 1998.

It should be noted that computer code in FIG. 11 handles categories formed by clusters and categories formed by keyword occurrence differently. This is because for every text document there is only a single cluster but there may be several keywords. The keywords need the extra loop to step through all the terms that occur with a given example. The computer system may, therefore, discover the predetermined time interval position as well as the category position. These numbers represent the indexes of the sparse matrix array. Each time a combination occurs, the counter is increased by one.

After the dates are counted, the computer system may calculate the probabilities of occurrence using, for example, the Chi squared function. For example, this may be performed by executing the computer code shown in FIG. 12.

As shown on line 4 of the computer code in FIG. 12, the expected value may be calculated by using statistics formulas, taking (the total count for the date * the total count for the category)/the total amount of text documents. In addition, as shown on line 6 of the computer code in FIG. 12, the parameters input to the Chi squared function include the total number of text documents (total), the total number of occurrences of a category of text documents (categoryCount), the total number of occurrences of a structured variable (variableCount), and the total number of occurrences of a structured variable/category combination on that particular date (counter).

Further, as shown on line 8 of the computer code in FIG. 12, for probabilities of occurrence over the threshold amount the computer system may record the probabilities into a vector where each element is an Event Marker. A pertinent portion of the code in Event Marker, showing all of the information that is taken from the counter-probability class and used to display the data in a table is shown in FIG. 13.

Figure 8:
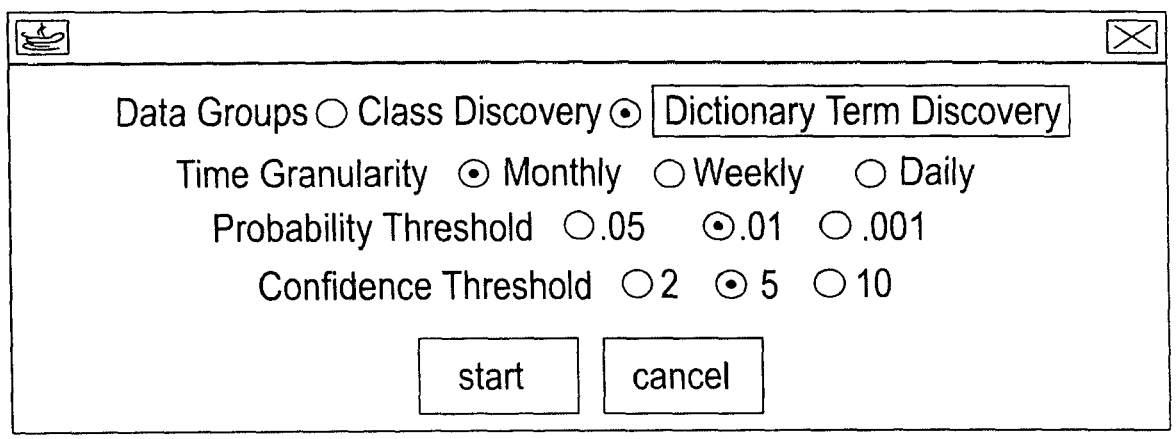
FIG. 8 shows a computer screen which was generated using eClassifier® software and which shows parameters which may be input by the user according to the present invention.

For example, using the computer code in FIG. 13 in the eClassifier software to analyze computer helpdesk problem tickets, and applying the parameters as defined on the GUI shown in FIG. 8, the inventors generated the table shown in FIG. 14.

For example, a user may analyze the data shown in FIG. 14 and choose to examine several different combinations of categories of text documents occurring over a particular month. For example, FIG. 14 indicates that the keyword "elimination" occurred 15 times in the month of July 1998, which is high when compared with the total amount of occurrences of "elimination" (24) in all of the text documents. In other words, over half the occurrences of this keyword occurred in July.

Figure 15:
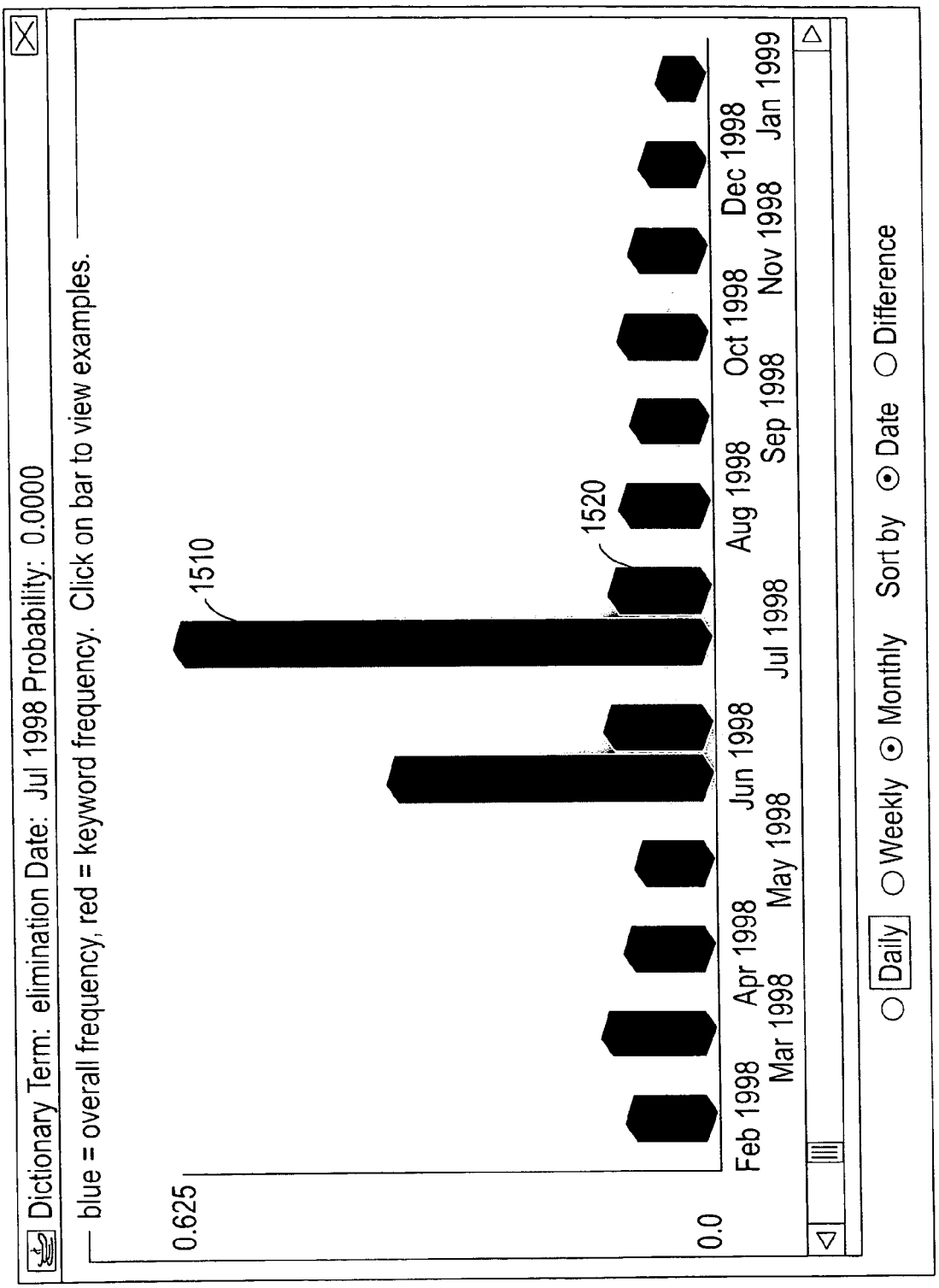
FIG. 15 shows a bar graph which was generated using eClassifier® software and which shows the occurrences of predetermined time interval/category combination according to the present invention.

Furthermore, the user may select, for example, the highlighted row "elimination" to generate the bar graph shown in FIG. 15. As shown in FIG. 15, July was a month where there was high occurrence of the keyword "elimination" (i.e., the long bar 1510) compared to all the other occurrences during that year (i.e., the short bar 1520).

Further, to further analyze the data, the user may select a bar (i.e., a particular month) on the bar graph of FIG. 15 to display each different example of the co-occurrence of the keyword and during that particular month. For example, if every occurrence of a keyword occurred during a particular month, the user may desire to search for the different occurrences of that keyword daily by selecting the daily radio button.

The inventive method 100 may, therefore, allow a user to automatically discover time dependencies within text documents by calculating the probability, for example, that a particular co-occurrence of a document category and a time interval would have occurred as a purely random event, without having to visually inspect a table or graph of data to find interesting co-occurrences.

In addition, it should be noted that the above-noted techniques for forming 120 categories of text documents (e.g., clustering, keyword occurrence, etc.) sometimes produce categories of text documents that are not directly analogous to human intuition about the data. For example, while some categories generated by the k-means algorithm may be coherent and useful, other categories may include nothing more than a miscellaneous collection.

Therefore, human judgment and expertise may be needed to generate semantically meaningful, complete and useful categories. Thus, the inventive method 100 may include manually refining data to eliminate meaningless categories. For example, as noted above, the eClassifier® software provides features for manually refining the keyword dictionary to eliminate meaningless entries.

In another aspect, the present invention may include a system 1600 for analyzing text documents.

Figure 16:
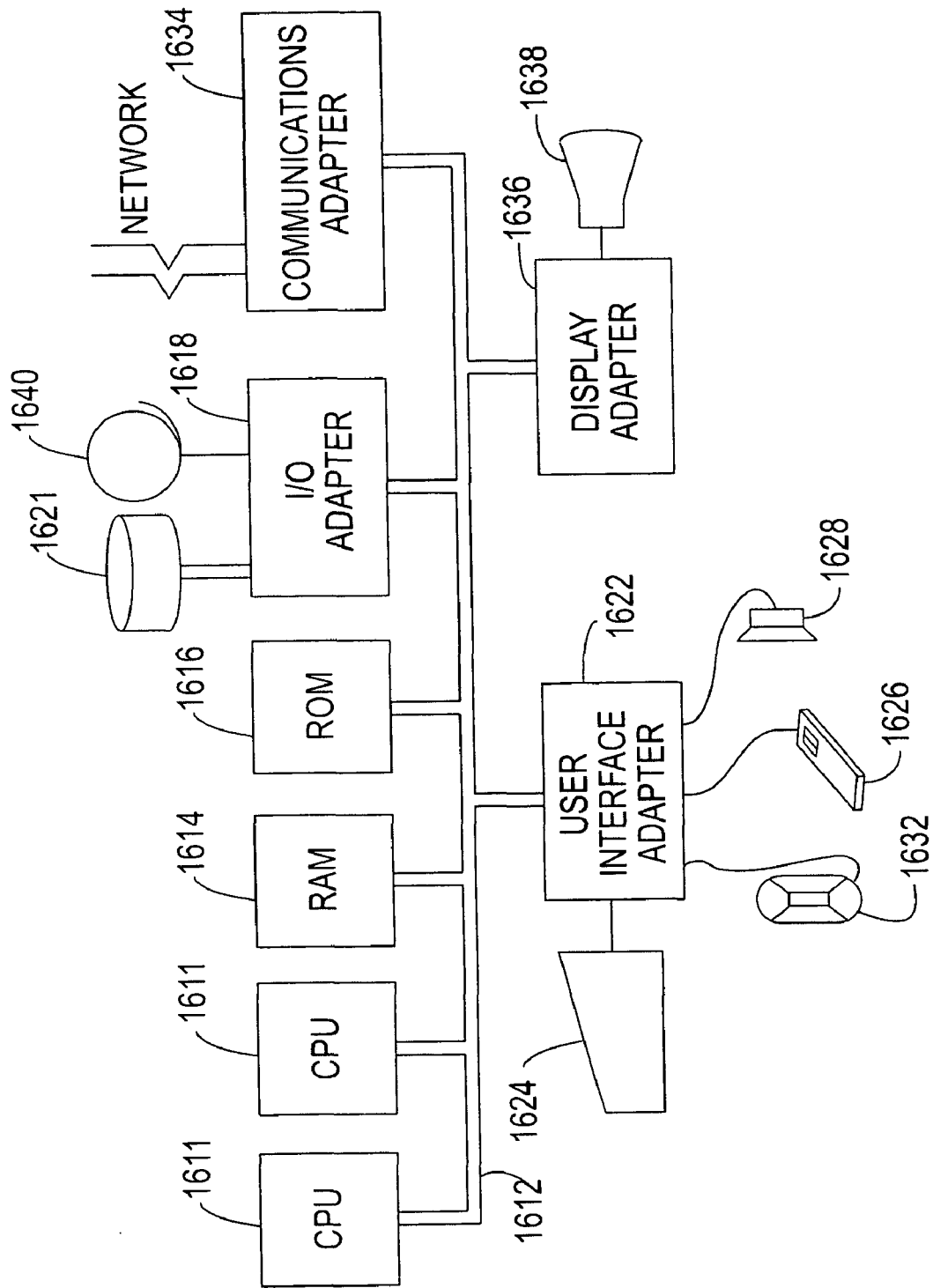
FIG. 16 illustrates an exemplary hardware/information handling system 1600 for identifying relationships between text documents and structured variables pertaining to the text documents according to the present invention.

As shown in FIG. 16, the inventive system 1600 preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting an information handling system to a data processing network, the Internet, an Intranet, a personal area network (PAN), etc., and a display adapter 1636 for connecting the bus 1612 to a display device 1638 and/or printer 1639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1611 and hardware above, to perform the method of the invention.

Figure 17:
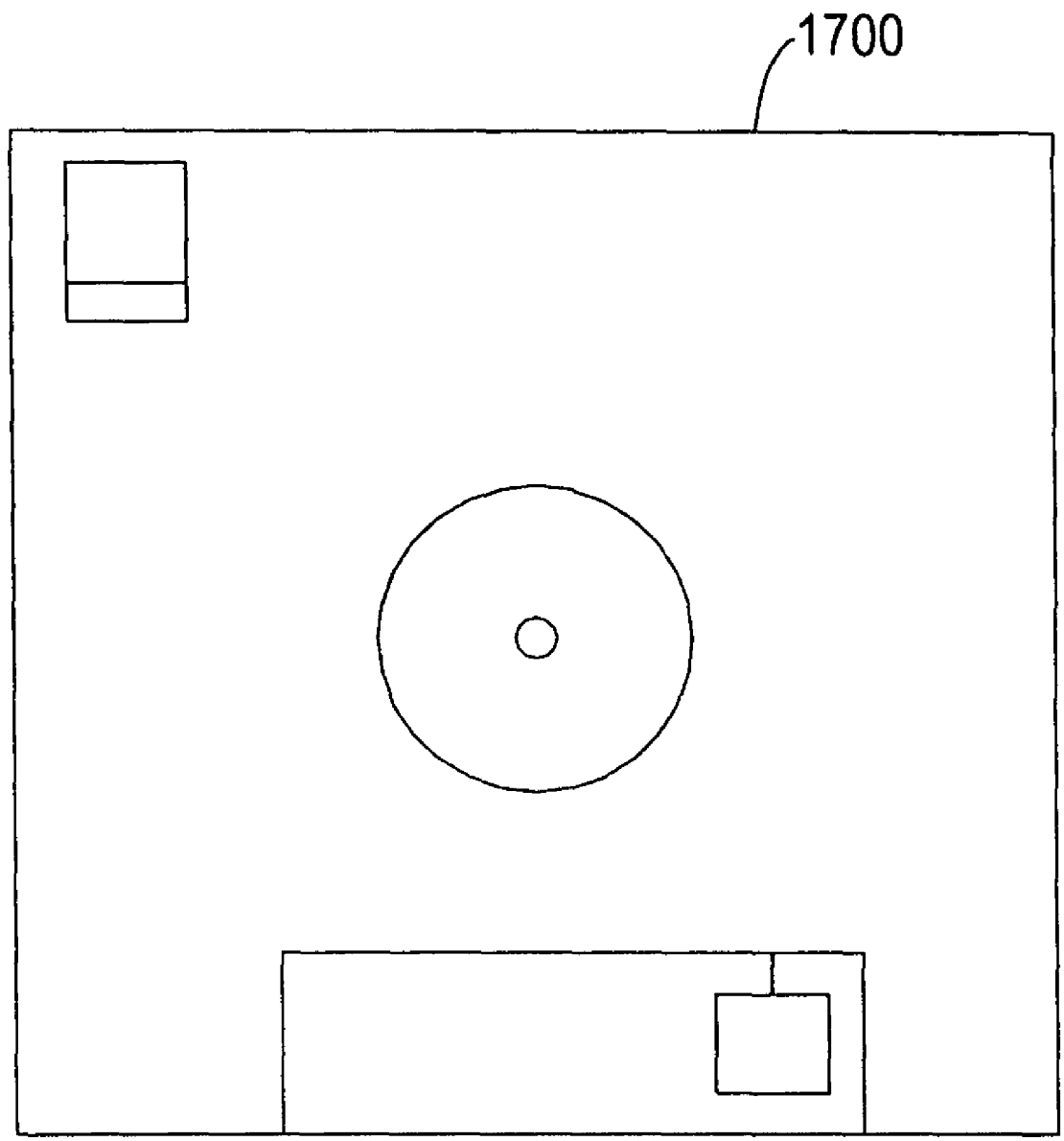
FIG. 17 illustrates a signal bearing medium 1000 (e.g., storage medium) for storing steps of a program of a method for identifying relationships between text documents and structured variables pertaining to the text documents according to the present invention.

This signal-bearing media may include, for example, a RAM contained within the CPU 1611, as represented by the fast-access storage for example. Alternatively, the instructions may be contained in another signal-bearing media, such as a magnetic data storage diskette 1700 (FIG. 17), directly or indirectly accessible by the CPU 1611.

Whether contained in the diskette 1700, the computer/CPU 1611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With it unique and novel features, the inventive method and system may automatically identify interesting relationships, including time dependent relationships, between structured variables and categories of text documents. Moreover, unlike conventional systems and methods where the user was required to search through a graph to discover interesting relationships, the inventive system and method automatically discover the interesting relationships for the user. Thus, the inventive method and system do not require a significant investment of human resources to extract meaningful features from text documents which is required by conventional systems and methods.

Further, while a preferred embodiment of the present invention has been described above, it should be understood that it has been provided as an example only. Thus, those skilled in the art will recognize that the invention can be practiced with modification within the spirit and scope of the appended claims. Specifically, although the invention has been discussed in terms of inspecting "text documents" it should be noted that the present invention may be used to discover interesting relationships in a single text document.

What is claimed is:

1. A computer implemented method for identifying relationships between text documents and structured variables pertaining to said text documents, comprising:
   providing a dictionary of keywords in said text documents;
   forming categories of said text documents using said dictionary and an automated algorithm;
   counting occurrences of said structured variables, said categories and combinations of said structured variables and said categories for said said text documents;
   calculating probabilities of occurrences of said combinations of structured variables and categories; and
   identifying a relationship between a structured variable of said structured variables and text documents included in a category of said categories based on a probability of occurrence of a combination of said structured variable and said category.

2. The method according to claim 1, wherein said algorithm comprises a keyword occurrence algorithm and wherein each of said categories comprises a category of text documents in which a particular keyword occurs.

3. The method according to claim 2, wherein said forming said categories comprises:
   generating a sparse matrix array containing a count of each of said keywords in each of said text documents.

4. The method according to claim 1, wherein said algorithm comprises a clustering algorithm and wherein each of said categories comprises a category of said text documents containing a particular cluster.

5. The method according to claim 4, wherein said clustering algorithm comprises a k means algorithm.

6. The method according to claim 4, wherein said forming said categories comprises inputting a predetermined number of categories.

7. The method according to claim 1, wherein said keywords comprise at least one of words and phrases which occur a predetermined number of times in said text documents.

8. The method of claim 1, wherein said calculating probabilities comprises using a Chi squared function.

9. The method of claim 1, wherein said providing said dictionary of keywords comprises:
   first parsing text in said text document to identify and count occurrences of words;
   storing a predetermined number of frequently occurring words;
   second parsing text in said text documents to identify and count occurrences of phrases; and
   storing a predetermined number of frequently occurring phrases.

10. The method according to claim 9, wherein said frequently occurring words and phrases are stored in a hash table.

11. The method according to claim 6, wherein said generating a sparse matrix array comprises:
   third parsing text in said text documents to count a number of times that each of said keywords occurs in each of said text documents.

12. The method according to claim 1, wherein said relationships comprise said combinations of structured variables and categories having a lowest probability of occurrence.

13. The method according to claim 1, wherein said method calculates a probability that a given co-occurrence of a structured variable and a category would have occurred as a purely random event.

14. The method according to claim 1, wherein said structured variables comprise predetermined time intervals.

15. The method according to claim 14, wherein said predetermined time intervals comprise one of days, weeks, months and years.

16. The method according to claim 1, wherein said structured variables comprise structured data,
   wherein said calculating said probabilities comprises using a result of said counting said occurrences of said combinations of structured variables and categories, and
   wherein said identifying said relationship comprises:
      determining whether said probability of occurrence of said combination of said structured variable and said category is below a predetermined value; and if said probability is below said predetermined value, designating said relationship as an interesting relationship.

17. A system for identifying relationships between text documents and structured variables pertaining to said text documents, comprising:
an input device for inputting text documents;
a processor for:
forming categories of said text documents;
counting occurrences of said structured variables, categories and combinations of structured variables and categories;
calculating probabilities of occurrence of said combinations of structured variables and categories; and
identifying a relationship between a structured variable of said structured variables and text documents included in a category of said categories based on a probability of occurrence of a combination of said structured variable and said category; and
a display, for displaying said probabilities.

18. The system according to claim 17, further comprising:
a memory for storing occurrences of said structured variables, categories combinations of structured variables and categories, and probabilities of occurrences of said combinations of structured variables and categories.

19. The system according to claim 17, wherein said structured variables comprise predetermined time intervals.

20. The system according to claim 19, wherein said predetermined time intervals comprise one of days, weeks, months and years.

21. The system according to claim 17, wherein said probabilities of occurrence of said combinations of structured variables and categories comprise a probability that a given co-occurrence of a structured variable and a category would have occurred as a purely random event.

22. The system according to claim 17, wherein said relationships comprise statistically significant relationships.

23. A programmable storage medium tangibly embodying a program of machine-readable instructions executable by a digital processing apparatus to perform a method for identifying relationships between text documents and structured variables pertaining to said text documents, said method comprising:
providing a dictionary of keywords in said text documents;
forming categories of said text documents using said dictionary and an automated algorithm;
counting occurrences of said structured variables, said categories and said combinations of structured variables and categories in said text documents;
calculating probabilities of occurrences of said structured variable/category combinations; and
identifying a relationship between a structured variable of said structured variables and text documents included in a category of said categories based on a probability of occurrence of a combination of said structured variable and said category.

* * * * *